July 18, 1967 W. B. ELMER 3,331,960

PORTABLE PHOTOGRAPHIC LIGHT

Filed Nov. 27, 1964

WILLIAM B. ELMER
INVENTOR

BY
ATTORNEY 3,331,960
PORTABLE PHOTOGRAPHIC LIGHT
William B. Elmer, Thornton, N.H., assignor to Sylvania
Electric Products Inc., a corporation of Delaware
Filed Nov. 27, 1964, Ser. No. 414,073
4 Claims. (Cl. 240—103)

This invention relates to lighting devices in which a reflector is used with a lamp, especially for photographic purposes. The invention relates particularly to reflectors for lamps utilizing an incandescent filament in an atmosphere containing a halogen gas or vapor, such as iodine, and is especially useful when the filament is highly concentrated and the lamp has all its connections at a single end.

The iodine incandescent lamp has been previously used in the lighting of scenes for motion picture photography, in which the lamps have been of 650 to 1000 watts power input and were operated from a regular power line of about 115 or 230 volts. For outdoor photography, as for news motion pictures for theaters and televisions stations, the lamp had to be used with storage batteries carried by the photographer, and so a smaller lamp of about 250 watts, was used with some sacrifice in light output.

For the amateur photographer, a smaller-wattage lamp had to be used, so that the battery supply could be made lighter for carrying, and operation, with a lamp of about 100–125 watts power input was desired.

Such a lamp was of too small light output for use with an ordinary reflector. The larger-wattage lamps could get uniform illumination over the scene to be photographed by covering an area larger than that which would appear in the picture. In fact as long as the reflector was a surface of revolution, it would produce a somewhat circular beam of light, which would have to be larger in diameter than the dimensions of the rectangular area to be photographed.

With the small-wattage lamp, this spill-over beyond the rectangular area to be photographed was a loss that could not be tolerated. All the available light had to be concentrated within the rectangle framing the area to be photographed. In addition, the light had to be concentrated in a manner which kept it sufficiently uniform over the same rectangular area.

I have discovered that this could be accomplished by using a central quasi-paraboloidal reflector with four non-paraboloidal zones near the outer portion of its perimeter at the open end where the light emerges.

At each end of the vertical diameter of the open end of the paraboloid, the reflector is bent inward to form a nearly cylindrical surface of smaller radii than that of the open end of the reflector. This nearly cylindrical surface should be smooth and specular, whereas the remainder of the reflector surface is dimpled to soften any sharp images of the lamp filament. Actually this surface is tapered inwardly and backwardly a small amount, about 1° generally being sufficient, and hence is actually slightly conical.

The resultant reflector, which can be pressed out of an aluminum sheet with a suitable die, will produce a substantially rectangular light beam of reasonably uniform intensity.

The two zones on opposite sides of the paraboloid which reflect light to extend the beam sidewards in the direction of the long axis of the rectangle can be substantially conical, with the radius of the one at the open end of the reflector being considerably smaller than that of the reflector, and with the surface of the cone merging gradually into the reflector, rather than making a sharp break with it. The profile of the surface of the cone would be tangent to the profile of the parabola at the place where they joined. I have discovered that this spreads the beam out to form the long axis of its rectangle.

The main quasi-paraboloidal reflector would of itself reflect a beam of circular cross-section, and the cross-section should be large enough to circumscribe approximately the desired rectangular beam. By my invention, the portions of the reflector which reflect light to the circle outside the circumscribed square are excised from the central paraboloidal reflector, leaving it as a central portion with four slender extending fingers or leaves all on the surface of the quasi-paraboloid. The portions to be excised can be determined by tracing rays back from the periphery of the desired rectangle to a line of the surface of revolution, by the usual well-known ray-tracing techniques.

Four new flared areas of compound curvature are then substituted for the excised areas the flares being arranged to direct light onto the desired rectangle, and add to that already reaching it from the main quasi-paraboloidal portion. These flared areas together super-impose additional uniform illumination upon the rectangle provided by the basic central area of the reflector, thus utilizing most of the usable light produced by the lamp.

The longitudinal centerline of the top flare joins the central reflector area without a break in the surface. The reflected ray from the joint strikes the rectangular pattern at the center of the *lower* margin, the pattern being convergent. Since there is no break in the reflector surface at the boundary between central area and flare, the rays are coincident from the edges of both areas, and this holds true throughout the entire boundaries between central areas and all flares.

As one progresses along the centerline of the top flare upward from the junction point with the central region, the reflected rays are projected at increasingly higher angles, and the curvature of this centerline is so designed as to cover the entire height of the centerline of the rectangular pattern. The reflected ray from the center of the top edge of the flare thus strikes the top center of the rectangle. The curvature of the flare is so graduated as to project a maximum light intensity at the bottom of the rectangular pattern, and this intensity tapers uniformly to a minimum value at the top edge of the rectangle.

All other sections of the flare away from the centerline (not necessarily plane sections) function in a similar manner. The top flare thus projects a second rectangular pattern of light substantially coinciding with that produced by the central section. The rectangle produced by the top flare, however, is most intense along its lower edge and graduates evenly all the way across to a minimum intensity at the top of the rectangle.

The bottom flare is an inverted duplicate of the top flare, and super-imposes an identical but inverted pattern over the others. Since the patterns from the top and bottom flares graduate evenly and equally from top to bottom, but in opposite directions, their sum is uniform over the entire rectangle.

The side flares function in an analogous manner to that described for the top and bottom flares, and they together contribute a third uniform rectangular pattern of light to the total.

The compound curvatures of the flares are so designed by the usual ray-tracing processes as to produce the distributions of light as described. The solid angles subtended by the various areas of the reflector are such for a rectangle with height equal to ¾ of the width that the top and bottom flares contribute less than the central area, and the side flares also contribute.

The top and bottom flares do not extend throughout to the plane of the front opening of the reflector, but end in slightly sloping planes, which are substantially cylindrical. This is done to avoid excessive height of the front opening of the reflector. This area is non-useful and could be cut out, blackened, diffused or left as is, provided no objectionably stray illumination is found to result.

Other objects, features and advantages of the invention will be apparent from the following specification, taken with the accompanying drawings in which.

Figure 1:
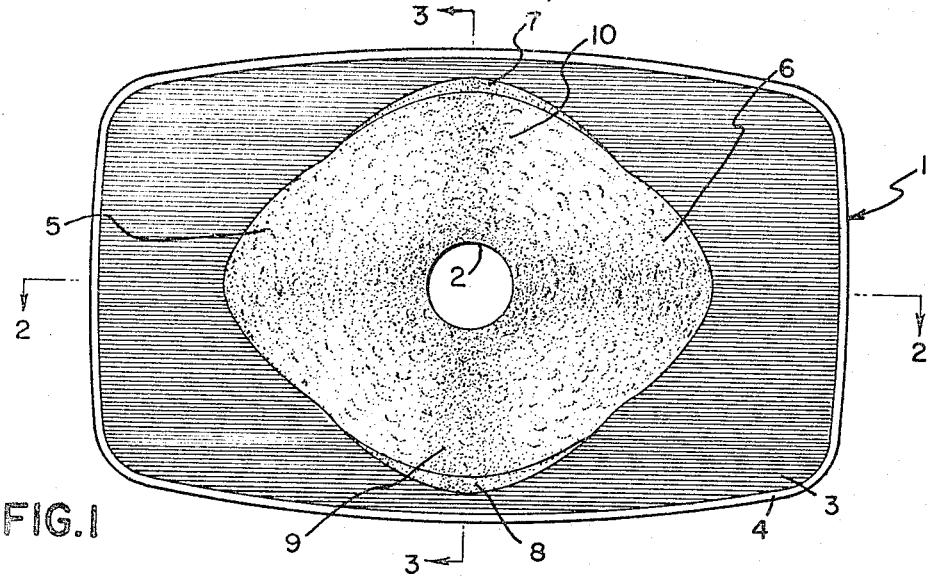
FIG. 1 is a front view of a reflector according to the invention.

In FIG. 1, the reflector 1 has the circular opening 2 at its apex, and the larger end of the reflector terminates in the flat plate 3, which has flange 4 around its edges. The reflector 1 has the outwardly extending flares 5, 6 at opposite sides in the direction of the long axis of the rectangle of light to be produced, and also of the long axis of the flat plate 3. The reflector 1 has the nearly cylindrical portion 7, 8 which are only very slightly conical making an angle of about 1° with the longitudinal axis of the reflector. This angle facilitates stamping of the pieces out of sheet metal, for it enables easy separation from the stamping tool. These cylindrical portions 7, 8 do not contribute to the light pattern on the rectangle, and can be blackened if desired. They were used so that the baseplate 3 of the reflector 1 can be narrowed along its shorter axis.

Figure 2:
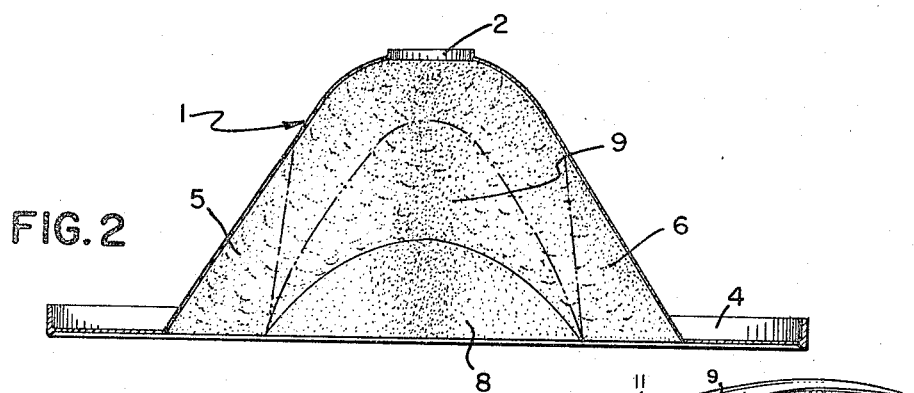
FIG. 2 is a longitudinal section of the reflector.
Figures 3, 4:
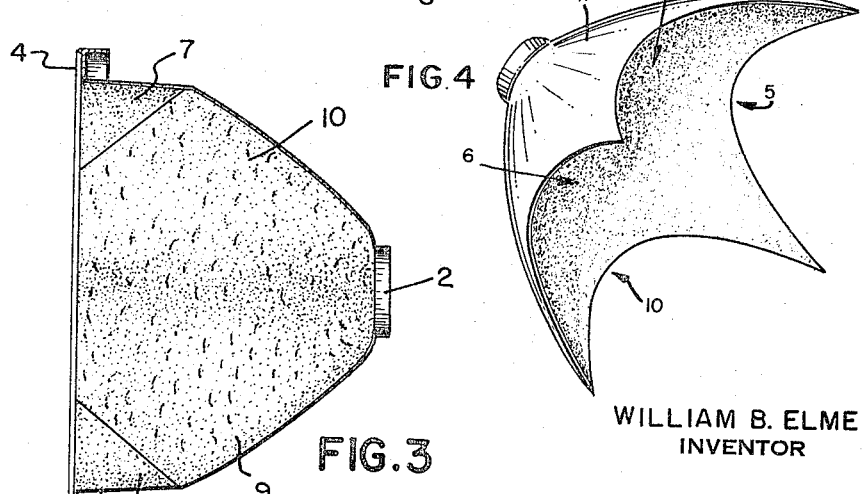
FIG. 3 is a transverse section of the reflector.
FIG. 4 is a perspective of the main central quasi-paraboloidal reflector omitting the zones which would contribute no light to the rectangular pattern of the beam on the subject to be illuminated.

FIGURE 4 shows the basic central quasi-paraboloidal curve of the reflector with zones 5, 6, 9 and 10 cut out since they contribute nothing to the light in the rectangular beam. These zones are then replaced by the corresponding flares 5, 6, 9 and 10 which take some of the otherwise wasted light and direct it into the rectangular beam. As shown in FIGURE 2, zone 9 extends from the main quasi-paraboloidal curve 11 to the beginning of the nearly-cylindrical portion 7, 8.

A small single-ended iodine lamp (not shown in the drawing) can be used at the focus of the main reflector 11, or slightly off the focus as shown in co-pending U.S. application, Ser. No. 355,225, filed by Beaton et al. on Mar. 27, 1964.

What I claim is:

1. A reflector for directing light over a substantially rectangular area, said reflector being other than a surface of revolution and comprising a main quasi-paraboloidal portion having four tapered, forwardly-extending fingers between which are reflecting flares of curvature sufficiently different from that of the main reflector to reflect light onto the rectangular pattern, the flares on opposite sides being substantially identical with each other, said flares each being substantially conical in their center region and blending to paraboloidal at their edges, the paraboloidal portions of the flares having shorter focus than that of the main paraboloidal section.

2. The reflector of claim 1 in which the flares join the main quasi-paraboloidal portion without discontinuity in the reflecting surface.

3. The reflector of claim 2, and a flat face plate around the large end of the reflector, the reflector and plate being a unitary piece of sheet metal.

4. The reflector of claim 3, in which two of the reflecting flares terminate in substantially cylindrical surfaces.

References Cited

UNITED STATES PATENTS

| | | | |
|---|---|---|---|
| 1,200,587 | 10/1916 | Cloninger | 240—41 XR |
| 1,747,283 | 2/1930 | Bean | 240—41.35 |
| 2,340,515 | 2/1944 | Dietrich | 240—41.35 |
| 2,492,946 | 1/1950 | Barber | 240—103 |
| 3,132,812 | 5/1964 | Strobel | 240—1.3 XR |

NORTON ANSHER, *Primary Examiner.*

F. L. BRAUN, *Assistant Examiner.*